(No Model.) 5 Sheets—Sheet 2.

D. T. PHILLIPS.
CORN HARVESTER.

No. 587,535. Patented Aug. 3, 1897.

WITNESSES:
E. T. Wray.
Jean Elliott

INVENTOR
Darius T. Phillips (No Model.) 5 Sheets—Sheet 3.

D. T. PHILLIPS.
CORN HARVESTER.

No. 587,535. Patented Aug. 3, 1897.

WITNESSES: E. T. Wray. Jean Elliott.

INVENTOR: Darius T. Phillips.

(No Model.)  5 Sheets—Sheet 5.
D. T. PHILLIPS.
CORN HARVESTER.

No. 587,535. Patented Aug. 3, 1897.

WITNESSES:
E. T. Wray
J. van Elliott

INVENTOR
Darius T. Phillips ated August 3, 1897.

UNITED STATES PATENT OFFICE.

DARIUS T. PHILLIPS, OF CHICAGO, ILLINOIS.

CORN-HARVESTER.

SPECIFICATION forming part of Letters Patent No. 587,535, dated August 3, 1897.

Application filed December 20, 1895. Serial No. 572,829. (No model.)

*To all whom it may concern:*

Be it known that I, DARIUS T. PHILLIPS, a citizen of the United States, residing at Chicago, in the county of Cook and State of Illinois, have invented a new and useful Improvement in Corn-Harvesters, of which the following is a specification, reference being had therein to the accompanying drawings.

My invention relates to improvements in corn-harvesters or machines for cutting standing corn in the field and binding and depositing it in bound bundles preparatory to shocking or stacking it; and the objects of my improvement are, first, to construct a machine with which two rows of corn can be cut simultaneously; second, to construct a machine of such material and in such a manner that it will be so light that one team can easily draw it while it is cutting and binding two rows of corn, and, third, of a size that will allow of its being operated between the rows of corn as ordinarily grown and avoid the necessity of either cutting out a row of corn or of running over it in starting into a field, as is now the custom with machines of this class. I attain these objects by the mechanisms illustrated in the accompanying drawings, marked 1, 2, 3, 4, 5, 6, 7, 8, 9, 10, and 11, all appropriately marked by figures and letters to aid in the description thereof.

This invention will be fully described in detail and then pointed out in the claims.

Figure 1:
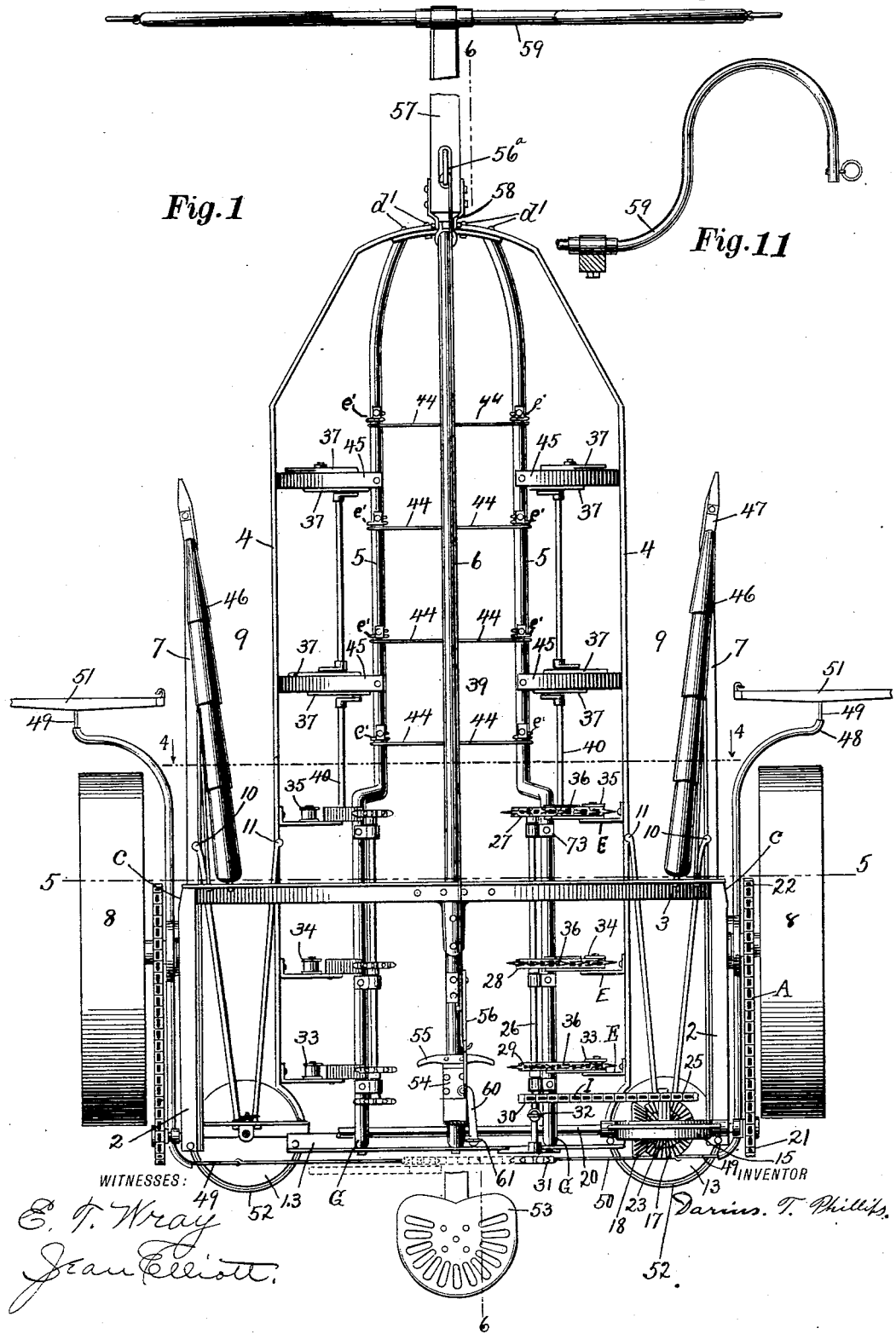
Figure 2:
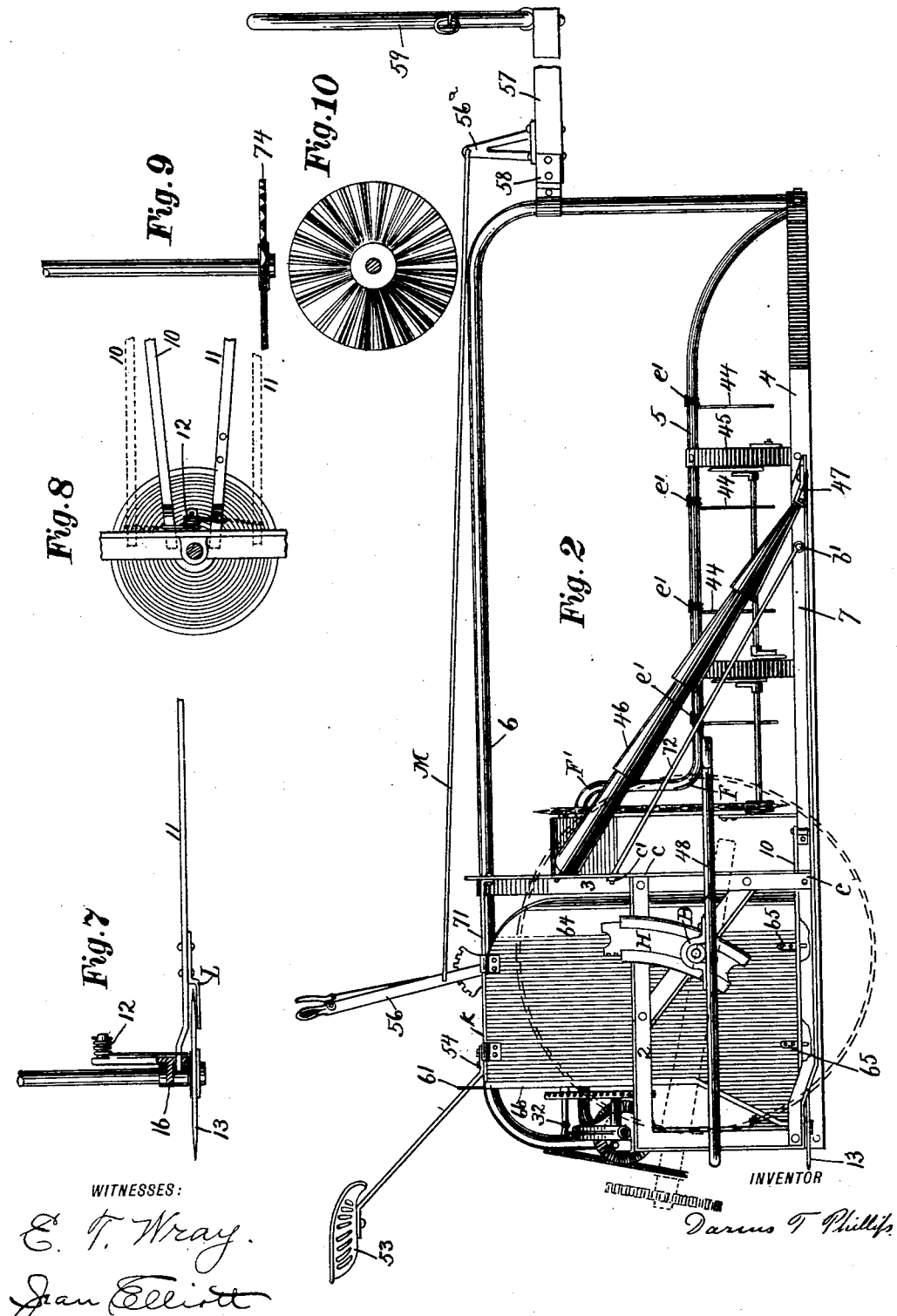
Figure 3:
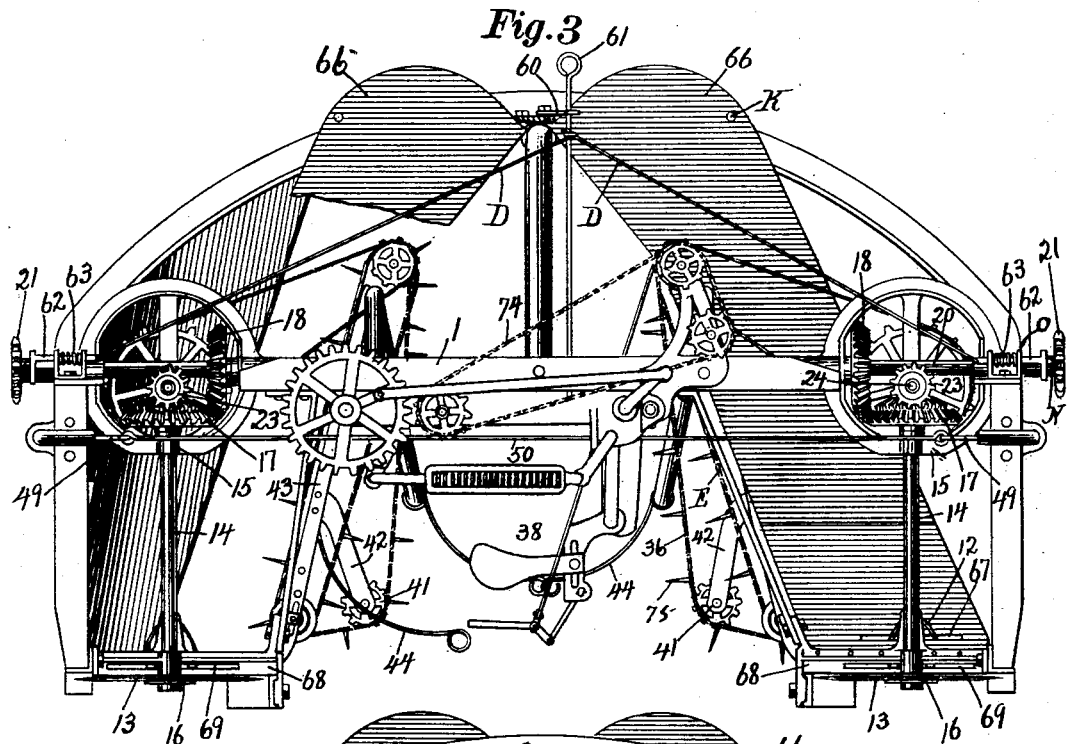
Figure 4:
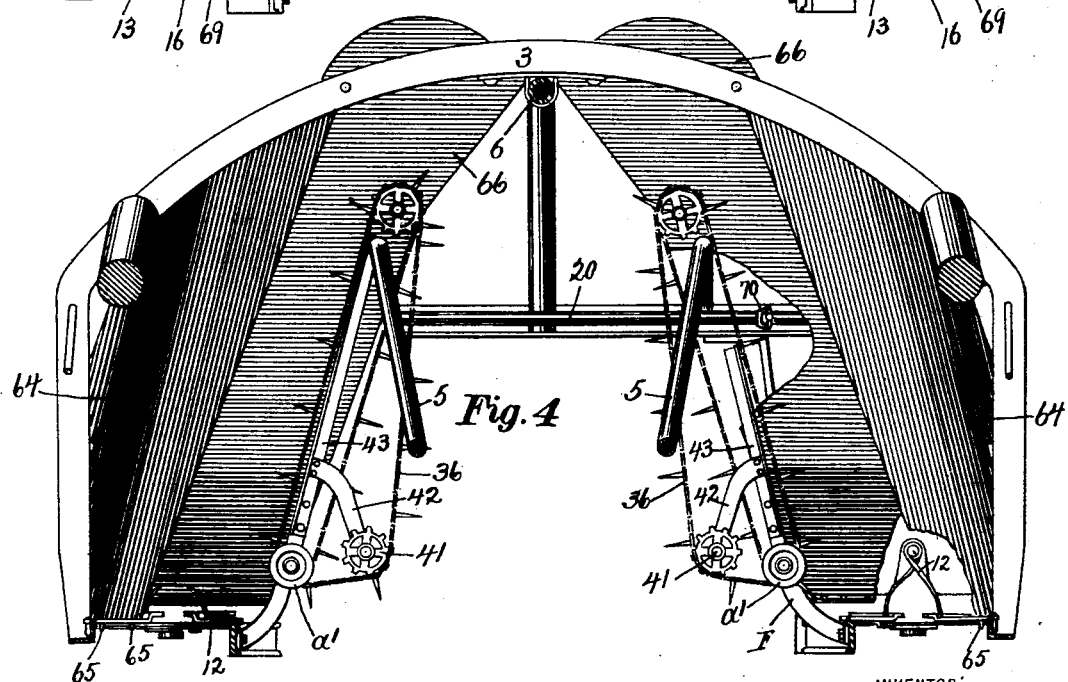
Figure 5:
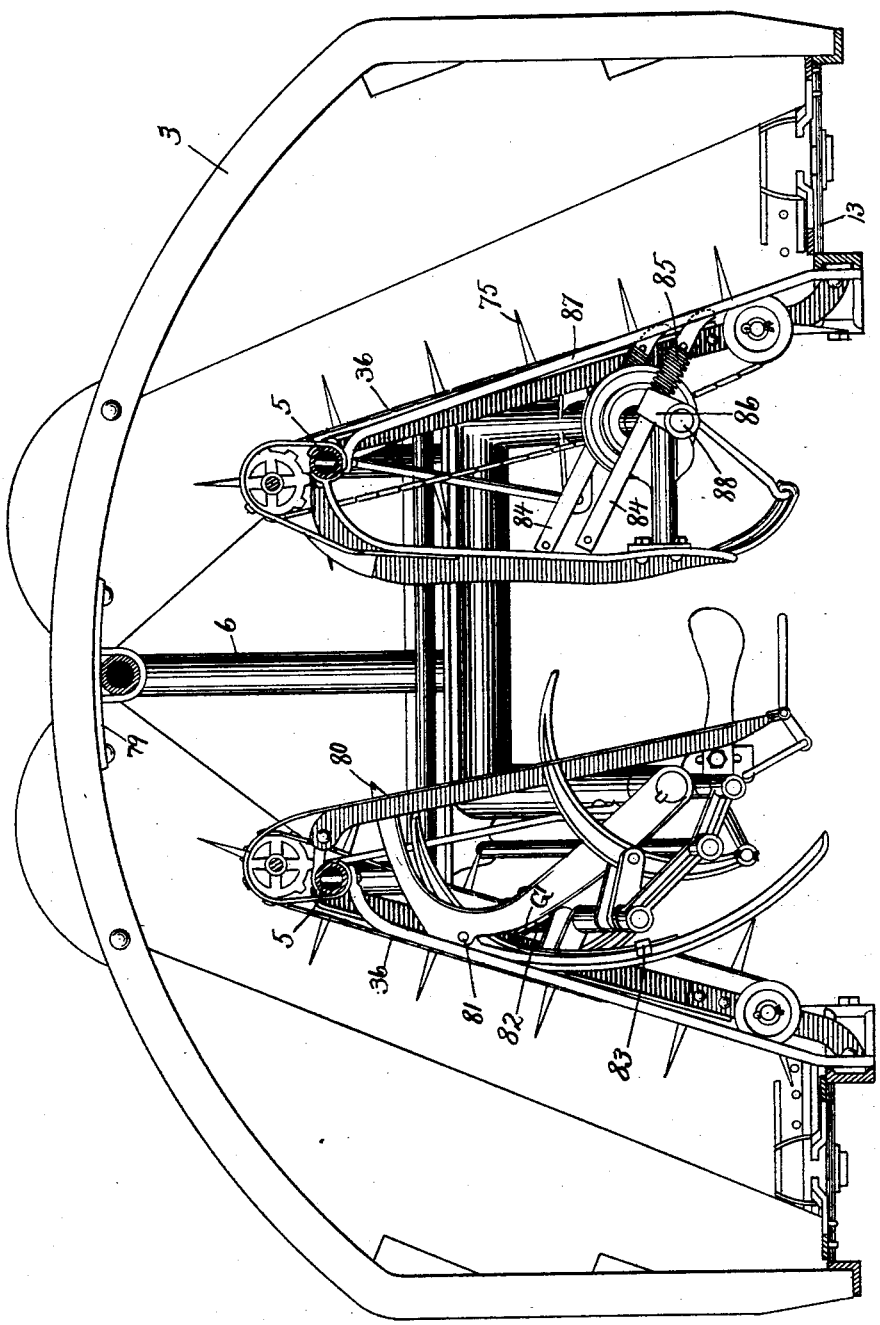
Figure 6:
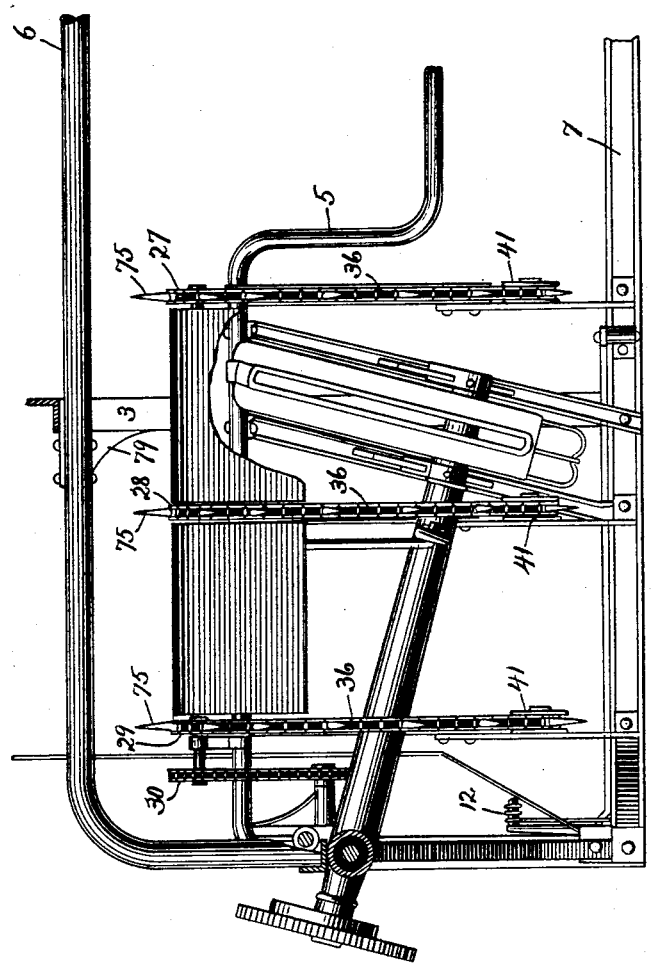

In the drawings, Figure 1 is a plan view of the machine, partly in section. Fig. 2 is a side elevation; Fig. 3, a rear elevation without the carrier-wheels; Fig. 4, a vertical cross-section with the carrier-wheels removed, taken through the line 4 4 on Fig. 1, looking toward rear of machine; Fig. 5, a vertical cross-section taken through the lines 5 5 on Fig. 1, looking toward the rear of the machine and with the carrier-wheels removed; Fig. 6, a sectional longitudinal elevation taken through the line 6 6 on Fig. 1; Fig. 7, a detail drawing showing side elevation of cutter, guide, and spring holding the same; Fig. 8, a plan view of guide and spring; Fig. 9, a side elevation of cutter-disk, showing corrugated or fluted cutting edge; Fig. 10, top view of cutter-disk; Fig. 11, detail rear view of neck-yoke.

Like figures and letters refer to like parts in each view.

The main frame or body of the machine will be constructed of angle-iron, iron tubing, and light iron cross-beams or other suitable material, the parts properly bolted and attached to one another in manner and form as shown more completely in drawings. This frame will consist of nine pieces, seven of which are longitudinal and two cross beams.

1 is the rear cross-beam of machine, bolted at each end to a casting 15, which is in turn bolted to the rear end of side beams 2, thus rigidly connecting the two side beams at the rear of the machine. (See Fig. 3.) The second cross-beam 3 is placed about three feet ahead of the rear one and is arched over the entire machine and securely bolted at each end to the lower outside longitudinal beams 7 at C, and is also fastened to the upper outside longitudinal beams 2, as shown at c on Fig. 2, and in the center to longitudinal beams 6. (See Figs. 1 and 2.)

The longitudinal beams 2 and 7 on each side of the machine constitute the outside beams of the machine. 2 is bent at a right angle at its rear end, fastened to 3 at its front end at C, (see Figs. 1 and 2,) to lower beam 7 at its rear end, and also fastened to the casting that connects with cross-beam 1 at its right angle.

In order to gather in the corn more readily, the lower outside beam 7 is extended well forward and bent slightly outward at its forward end, as is clearly shown in Fig. 1 at 47. Its rear end is bent upward so as to clear the cutter. This beam 7 is fastened at the rear end to beam 2 and near its center to beam 3 and is further strengthened by brace-rod 72, which is attached to beam 7 at b' and to beam 3 at c'. (See Fig. 2.)

The inner longitudinal beams 4, one on each side of the machine, have their front end gradually bent inward until they meet each other and are securely bolted at d' to a strap of iron and to beams 5 and 6. (See Fig. 1.) The rear end of beam 4 is curved to conform to the shape of the cutter and is then fastened to casting 68, which is securely attached to outside beams 2 and 7. Beam 4 is also supported by brace E, (see Fig. 3,) which extends upward and inward and is fastened to beam 1. Beams 4 are still further strengthened by brackets E E E and braces 45 45, connecting them with beams 5.

Beams 5 5, one on each side, are fastened at their front end to beams 4 4, and rising in a sharp curve well above the level of beams 4 4 extend backward to F, where they are again bent upward, rising to F'. They extend backward from F' and at their rear end have a sharp bend downward and are then bolted to cross-beam 1. (See G, Fig. 1.)

Beam 6 extends from the front to the rear of the machine and is fastened to beams 4 at its front end, to beams 3 near its rear end, and to beam 1 at its rear end. To form these connections, beam 6 is bent near its extremities, as seen in Fig. 2.

Attached to the frame of the machine a short distance to the rear of the arched cross-beam 3 by a common device which permits of raising and lowering the segment H, Fig. 2, and loose on a stationary axle, one on each side of the machine, are traction-wheels 8, which constitute the supporting and driving wheels of the machine.

Fastened to wheels 8, one on each side, is a sprocket-wheel 22, (see Fig. 1,) over which passes an endless chain A, which passes over sprocket-wheel 21 and drives the main shaft 20. This shaft extends across the rear of the machine and is held in position by passing through suitable bearings in casting 15, and to prevent binding has a universal joint 70. (See Fig. 4.) Fastened to shaft 20 are two beveled wheels 18, one on each side, which mesh with a double-beveled gear 17, fastened upon the upper end of shaft 14 and imparting motion to it. Shaft 14 passes through suitable bearings in castings 15 and 68, and at its lower end has a circular cutter 13 attached, one on each side of the machine.

Meshing with the double-beveled gear 17 is a small beveled gear 23, fastened on the end of a short shaft 24, which passes through suitable bearings in casting 15. To this same shaft 24 is attached sprocket-wheel 25, over which passes an endless chain I, (see Fig. 1,) which also passes over sprocket-wheel 30, Fig. 1, and imparts motion to shafts 26. Shafts 26, one on each side of the machine, are held in position by suitable brackets 73, fastened to parts 5 of the main frame, Fig. 1. On shafts 26 are fastened sprocket-wheels 27, 28, 29, 30, and 31. Sprocket-wheel 31 drives the binder by means of an endless chain 74 (see Fig. 3) and is on only one of the shafts 26. This shaft has a universal joint 32, Fig. 1, to allow the binder to be placed in an inclined position. (See dotted lines of the binder-frame, Fig. 2.)

Over sprocket-wheels 27, 28, and 29, on each side of the machine, run endless chains 36, which are provided with teeth 75, Fig. 3. These chains at their lower end run over adjustable sheaves, so that they may be loosened or tightened at will. These sheaves are fastened on a short stud passing through bar E. This bar E is securely fastened at its lower end to part 4 of the main frame and at its upper end to part 5 of the main frame.

The endless chain that runs over sprocket 27 on shaft 26 and sheave 35 also at its lower end runs over sprocket-wheel 41, (see Figs. 3 and 4,) which is fastened on the end of shaft 40 and imparts motion to it. Shaft 40 is held in position by a strong bracket 42, which has suitable bearings and is bolted to bar 43. Shaft 40 is also supported by brackets 45, which have suitable bearings and are fastened to bars 4 and 5 of the main frame. This shaft 40, one on each side of the machine, is a crank-shaft and has packers 37, similar to those in common use, fastened to it. (See Fig. 1.)

At $e'$, attached at intervals to parts 5 of the main frame, are several springs 44, that are bent downward and inwardly from each side of the machine, Figs. 1 and 2, thus forming a receptacle for the tops of the corn to rest in until sufficient has been accumulated to form a bundle, the size of which is regulated by the binder. These springs will open and allow the bundle to drop onto the ground, when the discharge-arms of the binder force the butts of the bundle down and out of the rear part of the machine.

On each side of the machine are divider-rolls 46, or gathering-arms, forming a series of cone-shaped rolls, so that while the cornstalk will pass upward over it very readily it will be prevented from falling down by coming in contact with the large end of the cone. These rolls are fastened to the forward ends of parts 7 of the main frame, and extending upward and backward at an angle of about forty-five degrees (see Fig. 2) their upper or base ends form a receptacle or bearing for the lower or cone end and are fastened to parts 3 of the main frame at their upper bearing and to parts 7 at their lower bearing. In this position the lower ends will pass under bent or leaning stalks as the machine moves forward and gradually lift them up. The upper ends are also inclined inwardly, so that the stalks will be forced in toward the elevating-chains 36. (See Figs. 1 and 3.) They are loose in their bearings at both ends, so that they will roll when coming in contact with the corn. These rolls are held at the lower end by brackets 47, which are attached to beam 7, and at the upper end by shafts passing through part 3 of the main frame. (See Figs. 1 and 2.)

48 is tubing bent and fastened to the axle, (see B, Fig. 2,) one on each side of the machine, for the purpose of carrying chain or wire rope, to which the whiffletrees are fastened; 49, a wire rope; 50, rod connecting 49 with its duplicate; 51, whiffletrees; 52, guards for circular cutters; 53, seat; 54, attached seat-spring; 55, foot-rest; 56, tilting lever and bracket fastened to part 6 of the main frame, (see Fig. 2;) M, a rod connecting the tilting lever to bracket 56ª, fastened to tongue; 57, short tongue; 58, hinge to tongue to allow of tilting; 59, neck-yoke bent so as to allow standing corn to pass under without being broken, (see Fig. 11;) 60, bracket for holding rod used to throw machine out and into gear, (see Fig. 3;) 61, rod for throwing out and into gear, held in place by passing through bracket 60 and part 1 of the main frame and connected by rods D to forks 62, one on each side. These forks 62, by means of spring 63, hold a clutch N in gear with sprocket-wheel 21. Spring 63 and forks 62 are held in position by brackets O, fastened to castings 15. On each side of the machine are sheet-iron plates 66, closing the rear of the machine. They are fastened at their lower end to castings 68, Fig. 3, at their upper end to part 6 of the main frame, and are also held in position by rod K, which extends longitudinally to part 3 of the main frame, to which it is attached. Near the lower end of plates 66 is a slot 67 to permit the passing through of a spring.

The sheet-iron plates 64, Figs. 2 and 4, have their front edge curved or bent outward, so as to present a smooth surface to the incoming corn. They are hinged at the top to rod K and at the bottom are fastened to guides 10 by pins 65, which allow them to move out and in with the guides and to press the corn over toward the carrying-chains.

10 and 11 are two steel guide-rods on each side of the machine. 10 is fastened at its front end to part 7 of the main frame and 11 is fastened at its front end to part 4 of the main frame. These guides, which are about three feet in length, pass backward from their hinged ends over the circular cutters, their rear ends resting in slot 69 in casting 68. (See Fig. 3.) Their rear ends are held by a spring 12, (see Fig. 8 detailed drawing,) which permits them to open and shut and to adjust themselves to the different-sized hills and varying width of the rows of corn. Fastened to the inner guide 11, one on each side of the machine, is a small guard L, (see Fig. 7,) thus making a double guard for the cutter to work through.

Detailed drawing Fig. 5 shows how the spring regulating the guides 10 and 11 is fastened to casting 68. (See Fig. 3.)

Detailed drawing Fig. 8 shows the guides 10 and 11 open and closed.

Detailed drawing Fig. 9 shows the cutter 74 with radial corrugations or fluted at its periphery. By this fluting more strength is obtained and more or less of a saw tooth; also, after the corn is cut the roughened surface caused by this fluting carries the cornstalks sidewise to the elevating-chains.

Detailed drawing Fig. 10 shows the fluted top of the cutter.

79 is a bracket attached to cross-beam 3 and longitudinal beam 6, as shown on Figs. 5 and 6, and provides a supporting connection to each.

80 is the ordinary binder-needle, with the exception that it has a hinge 81 for the purpose of allowing the long end of the needle to be bent in as the needle returns to its place and not extend out beyond the carrying-chains 36 and prevent the corn from being carried up, as would be the case without the hinge. To strengthen the hinged part of the needle to its original position in binding, is a spring 82, riveted to the needle at G', (see Fig. 5,) its free end passing through a loop 83, which is fastened to the lower end of the needle.

Another change in my invention from the ordinary grain-binder is in the discharge-arms 84, (see Fig. 5,) which instead of being fastened upon shaft 88 in a stationary position are straight bars which slide in a bracket 86, so that as they turn around they will not extend out across and beyond the chains and prevent the corn from being elevated, but will be forced in by a guide-bar 87 and will be forced out to the normal or original position by spring 85 when they are turned around away from guide-bars 87.

In use the operation is as follows: The horses being attached, one on each side of the machine, are driven by the use of spread-reins, so that part 7 and part 4 of the main frame on one side of the machine will pass one on each side of one of the rows of corn to be cut, and part 7 and part 4 of the other side of the machine will pass one on each side of the second row to be cut. As the machine moves forward, the cornstalks come first in contact with rollers 46, which force them sidewise toward the carriers and toward the center of the machine. They then come in contact with frame 3, which pushes them forward, so that when they are cut they are leaning forward and sidewise toward the center of the machine and fall upon the teeth 75 of the carrying-chains 36, which, in connection with packers 45, deliver the stalks into the binder and receptacle formed by the arms e' in the center of the machine.

After being bound the bundle is discharged butt-end first in such a manner that its weight assists in its delivery from the machine. It falls to the ground between the two cut rows, where it is entirely out of the way in making the second round.

Having fully described my invention, what I claim, and desire to secure by United States Letters Patent, is—

1. In a corn-harvester, the combination with the frame and traction-wheels, of a binder located between the paths of the traction-wheels, cutters between the traction-wheels at opposite sides of and in rear of the binder, cornstalk-engaging means for prostrating the stalks forward, elevating them and discharging them from opposite sides into the binder, and draft connections for horses in front of the wheels respectively, whereby the machine may be operated to cut and bind two adjacent rows of corn, the horses walking outside of both rows, and the bundle being formed between them, substantially as described.

2. In a corn-harvester, the combination with the frame and traction-wheels, of two independent cutters located inward from the paths of the wheels, respectively, a binder located between the paths of the cutters and forward of their transverse plane, and suitable means for prostrating the stalks forwardly from the cutters respectively, and for carrying them laterally from both sides toward the middle to the binder, whereby the bundle is accumulated and bound between the rows of stalks operated upon, substantially as described.

3. In a corn-harvester, in combination with the frame, two supporting-wheels for the same; draft connections for the horses in front of the wheels respectively; two independent cutters located inward from the paths of the wheels respectively, and a binder located between the paths of the cutters and forward of their transverse plane; and suitable means for prostrating the stalks forwardly from the cutters respectively and for carrying them laterally from both sides toward the middle to the binder; whereby the bundle may be accumulated between the horses.

4. In a corn-harvester, in combination with the frame, two supporting-wheels; draft connections for horses in front of such wheels respectively; stalk-gathering arms inside the paths of the wheels respectively; a stalk-divider frame located between the stalk-gathering arms forming stalk-guideways between said gathering-arms respectively and said divider; a barrier extending across said stalk-guideways at the rear part thereof; and cutters located rearward of the vertical plane of said barrier in the line of said stalk-guideways; and elevating mechanisms located inward from said paths respectively and adapted to deliver the stalks midway between them, whereby the stalks are gathered and leaned forward before being cut, and are carried from both sides toward the middle.

5. In a corn-harvester, in combination with the two supporting-wheels; gathering-arms located inward from and adjacent to the paths of said wheels respectively; a divider-frame between the gathering-arms; elevating mechanisms in said divider-frame, and a cradle or stalk-receptacle between said elevating mechanisms, and suitable means for prostrating the stalks forwardly and for severing the same.

6. In a corn-harvester, in combination with the frame and the supporting-wheels, gathering-arms extending forwardly and inclined inwardly at their rear, whereby they are adapted to lean the stalks inwardly and to gather the same; a divider-frame located between the gathering-arms and having its guards inclined inwardly forming guideways for the stalks between the gathering-arms respectively and the divider-frame; elevating devices mounted on said divider-frame and operating upward in said guideways respectively; and a cradle or stalk-receptacle located between said elevating devices and into which they are adapted to discharge.

7. In a corn-harvester, in combination with the frame, two cutters in position to encounter and cut adjacent rows of corn; stalk-guideways in advance of said cutters respectively; suitable means for prostrating the stalks forward from the cutters in the guideways; a receptacle forward of the vertical plane of the cutters and midway between their paths, and conveying mechanisms adapted to carry the stalks from the stalk-guideways respectively laterally into said receptacle from both sides, and a binder adapted to bind them therein.

8. In a corn-harvester, a frame comprising lateral rigid structures having the wheel-bearings respectively; a transverse rigid structure which connects said lateral structures rigidly at the rear, and an elevated arch or span which connects them forwardly of said rear connection; a central bone or frame-bar secured to the elevated span or arch and to the rear transverse structure and projecting forwardly from the arch, and a frame supported at the rear by the said rear transverse structure and extending forwardly under the arch and suspended at the forward end from the forward end of the central bone; whereby the space above said suspended frame and below the arch and bone is transversely free from obstruction.

9. In a corn-harvester, a frame comprising lateral rigid structures having the wheel-bearings respectively; a transverse rigid structure which connects said lateral structures rigidly at the rear, and an elevated arch or span which connects them forwardly of said rear connection; a central bone or frame-bar secured to the elevated span or arch and to the rear transverse structure and projecting forwardly from the arch, and a frame supported at the rear by the said rear transverse structure and extending forwardly under the arch and suspended at the forward end from the forward end of the central bone; whereby the space above said suspended frame and below the arch and bone is transversely free from obstruction; in combination with cutters located at opposite sides of said suspended frame forwardly of the rear transverse structure, and suitable means for prostrating the stalks forwardly from the cutters on opposite sides of said frame and for carrying them laterally from both sides toward the middle of the frame.

10. In a corn-harvester, a frame comprising lateral rigid structures having the wheel-bearings respectively; a transverse structure which connects said lateral structures rigidly at the rear, and an elevated arch or span which connects them forwardly of said rear connection; a central bone or frame-bar secured to the elevated span or arch and to the rear transverse structure and projecting forwardly from the arch; and a frame supported at the rear by the said rear transverse structure, and extending forwardly under the arch and suspended at the forward end from the forward end of the central bone, whereby the space above said suspended frame and below the arch and bone is transversely free from obstruction; in combination with cutters located at opposite sides of said suspended frame forwardly of the rear transverse structure, and suitable means for prostrating the stalks forwardly from the cutters on opposite sides of said frame, and for carrying them laterally from both sides to the middle of the frame; and a binder mounted over said suspended frame and under the bone.

11. In a corn-harvester, a frame comprising lateral-rigid structures having the wheel-bearings respectively; a transverse rigid structure which connects said lateral structures rigidly at the rear and an elevated arch or span which connects them forwardly of said rear connection, a central bone or frame-bar secured to the elevated span or arch and to the rear transverse structure and projecting forwardly from the arch; and a frame supported at the rear by the said rear transverse structure, and extending forwardly under the arch and suspended at the forward end from the forward end of the central bone, whereby the space above said suspended frame and below the arch and bone is transversely free from obstruction; in combination with cutters located at opposite sides of said suspended frame forwardly of the rear transverse structure, and suitable means for prostrating the stalks forwardly from the cutters on opposite sides of said frame and for carrying them laterally from both sides toward the middle of the frame; and a binder mounted above said suspended frame and under the arch, said frame being open at the bottom beneath the binder, and having a yielding stalk-supporting cradle at the bottom at the forward part.

12. In a corn-harvester, a frame comprising lateral rigid structures having the wheel-bearings respectively; a transverse rigid structure which connects said lateral structures rigidly at the rear, and an elevated arch or span which connects them forwardly of said rear connection; a central bone or frame-bar secured to the elevated span or arch and to the rear transverse structure and projecting forwardly from the arch; and a frame supported at the rear by the said rear transverse structure and extending forwardly under the arch and suspended at the forward end from the forward end of the central bone; whereby the space above said suspended frame and below the arch and bone is transversely free from obstruction; in combination with cutters located at opposite sides of said suspended frame forwardly of the rear transverse structure, and suitable means for prostrating the stalks forwardly from the cutters on opposite sides of said frame and for carrying them laterally from both sides toward the middle of the frame; said frame comprising a stalk-receptacle at the middle part of its width extending throughout its length, being open at the bottom at the rear part; and a binder mounted above said rear part and comprising a gate extending across said bottom which is opened to permit the discharge downward of the butts of the bundle.

13. In a corn-harvester, in combination with two cutters in position to encounter and cut adjacent rows of corn, means for prostrating the corn so cut substantially in the direction of travel; a binder located between the paths of travel of the cutters having its trunk at the rear and its shaft-bearing arms projecting forwardly from such trunk with a downward inclination; and suitable means for carrying the prostrate stalks laterally from both sides into the binder.

14. In a corn-harvester, in combination with the cutter; a gathering-arm comprising at its upper edge an inclined roller consisting of successive conical conaxial elements, all set base rearward; substantially as and for the purpose set forth.

15. In a corn-harvester, in combination with two elevators and a binder between them; the needle or binding arm and the discharge-arms being adapted to be forced yieldingly inward toward the binder-space when the said needle and discharge arms retreat.

16. In a corn-harvester, the combination with the frame having the longitudinally-extending parts 5 and 7, of guides pivotally connected at one end thereto and extending backward and convergently from their points of connection, cutters toward the rear end of the frame over which said guides pass, slots in the frame in which said guides rest at their rear ends, adjusting-springs for the guides, and cutter-guards on the guides comprising downward and backwardly extending pieces, substantially as and for the purpose set forth.

17. In a corn-harvester, in combination with the frame and guides 10, sheet-iron plates 64, hinged at their top to rod K and attached to guide 10 in such a manner as to allow them to move in and out with the guides, substantially as described and set forth.

DARIUS T. PHILLIPS.

Witnesses:
E. T. WRAY,
JEAN ELLIOTT.